Patented Dec. 24, 1929

1,740,809

UNITED STATES PATENT OFFICE

CECIL JOHN TURRELL CRONSHAW AND WILLIAM JOHNSON SMITH NAUNTON, OF MANCHESTER, ENGLAND, ASSIGNORS TO BRITISH DYESTUFFS CORPORATION LIMITED, OF MANCHESTER, ENGLAND

PROCESS FOR THE MANUFACTURE OF METALLIC XANTHATES

No Drawing. Application filed February 17, 1926, Serial No. 88,915, and in Great Britain March 27, 1925.

This invention relates to the manufacture of xanthates. Alkali metal xanthates have hitherto been made by treating a solution of the metallic hydroxide in absolute alcohol with carbon disulphide, care being taken to keep the reaction temperature below about 30° C. to avoid decomposition (Sacc., Annalen 51, 346). Insoluble xanthates, such as zinc xanthate, have been obtained from the solution of the alkali metal xanthate by direct precipitation.

We have now found that it is possible to obtain the insoluble xanthates in good yields and of a high degree of purity without employing either absolute alcohol (or even alcohol of high concentration) or special precautions for keeping down the reaction temperature. The reaction is exothermic and in the present invention the reaction mixture is allowed to develop heat and take its own temperature. Water is always present in the mixture. According to this invention, we manufacture insoluble xanthates by dissolving at least the theoretical quantity of alkali metal hydroxide in a convenient quantity of water, as, for instance, KOH in half its weight of water, and slowly adding the solution to a well agitated mixture of the theoretical quantities of carbon disulphide and ordinary alcohol, such as methylated spirit, or, in the case of the higher homologues, as a mixture of alcohol and water such as the constant-boiling mixtures, which mixtures are considerably cheaper than the corresponding alcohols of higher concentration. Ordinary alcohol is a constant boiling mixture of water and ethyl alcohol. The reaction vessel is provided with a reflux condenser and it is unnecessary to keep the temperature below any given value. The temperature rises to the boiling point of the mixture of liquids present. After stirring for a few hours, the reflux is replaced by an ordinary condenser and any unchanged carbon disulphide and alcohol are recovered by distilling them off. The residual product is dug out of the distilling vessel. The crude alkali-metal xanthate is now dissolved in a convenient quantity of water and is treated with a just sufficient quantity of very dilute acid, such as hydrochloric acid, to neutralize any free alkali and to decompose such by-products as alkali thiocarbonates (the solution being for convenience made neutral to so-called "yellow paper" used in laboratories for testing neutrality. This "yellow paper" is made with the aid of "brilliant yellow"—Color index No. 364). To this solution is added, with stirring, the theoretical quantity of the solution of the soluble salt of the metal which gives the insoluble xanthate desired, when such metallic xanthate will be precipitated in such a state of division that after washing, it is obtained in a high state of purity.

The invention is not limited to any particular alcohol or metal.

We claim:—

1. The process of obtaining insoluble xanthates in a high state of purity, which comprises treating a solution of an alkali metal hydroxide in water with commercial alcohol and with carbon disulphide, said treatment being at the normal temperature of reaction, forming an aqueous solution of the alkali metal xanthate, treating this solution with just sufficient very dilute acid to remove thiocarbonates and free alkali and produce a solution which is neutral to yellow paper, and adding thereto a soluble salt of a metal which gives an insoluble xanthate.

2. The process of obtaining insoluble xanthates in a high state of purity, which comprises treating a solution of an alkali metal hydroxide in water with commercial alcohol and with carbon disulphide, said treatment being at the normal temperature of reaction, forming an aqueous solution of the alkali metal xanthate, treating this solution with just sufficient very dilute acid to remove thiocarbonates and free alkali and produce a solution which is neutral to yellow paper, and adding thereto a soluble zinc salt.

3. The process claimed in claim 2, in which the said soluble zinc salt is zinc chloride.

4. The process of obtaining insoluble xanthates in a high state of purity, which comprises treating a solution of an alkali metal hydroxide in water with a constant-boiling mixture of alcohol and water and with carbon disulphide, said treatment being at the normal temperature of reaction, forming an aqueous solution of the alkali metal xanthate, adding a quantity of very dilute acid just sufficient to make the solution neutral to yellow paper, and adding thereto a soluble salt of a metal which gives an insoluble xanthate.

5. The process of obtaining insoluble xanthates in a high state of purity, which comprises dissolving at least the theoretical quantity of an alkali metal hydroxide in water, adding the solution to a mixture of commercial alcohol and carbon disulphide under conditions allowing the temperature to rise, recovering the excess of alcohol and carbon disulphide after reaction by distillation, dissolving the crude alkali xanthate in water, adding a quantity of very dilute acid to make it neutral to yellow paper and decompose any by-products, and adding a solution of a soluble salt of a metal which gives an insoluble xanthate, thereby precipitating the corresponding metallic xanthate.

6. In obtaining insoluble xanthates in a high state of purity, the process which comprises treating an aqueous solution of crude alkali metal xanthate with just sufficient very dilute acid to remove thiocarbonates and free alkali and produce a solution which is neutral to yellow paper, and adding thereto a solution of a soluble salt of a metal which forms an insoluble xanthate.

7. A method of purifying alkali metal xanthate solution which consists in adding a mineral acid thereto in substantially the theoretical amount to react with all the carbonates, thiocarbonates, sulphides, and other impurities present.

In testimony whereof we have hereunto affixed our signatures.

CECIL JOHN TURRELL CRONSHAW.
WILLIAM JOHNSON SMITH NAUNTON.